(12) United States Patent
Ichikawa et al.

(10) Patent No.: US 9,211,882 B2
(45) Date of Patent: Dec. 15, 2015

(54) DRIVE CONTROL DEVICE (75) Inventors: Kazuki Ichikawa, Wako (JP);
Mitsuhiro Iwadare, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/344,097

(22) PCT Filed: Sep. 13, 2012

(86) PCT No.: PCT/JP2012/073519
§ 371 (c)(1),
(2), (4) Date: Mar. 11, 2014

(87) PCT Pub. No.: WO2013/039172
PCT Pub. Date: Mar. 21, 2013

(65) Prior Publication Data
US 2014/0349814 A1 Nov. 27, 2014

(30) Foreign Application Priority Data

Sep. 14, 2011 (JP) .................................. 2011-201025

(51) Int. Cl.
*F16H 29/22* (2006.01)
*F16H 29/04* (2006.01)
(Continued)

(52) U.S. Cl.
CPC ............. *B60W 10/101* (2013.01); *B60W 10/02* (2013.01); *B60W 10/06* (2013.01); *B60W 30/1846* (2013.01); *F16H 29/04* (2013.01); *F16H 29/22* (2013.01); *B60W 2510/104* (2013.01); *B60W2710/0677* (2013.01); *B60W 2710/1005* (2013.01); *F16H 29/14* (2013.01); *F16H 61/66272* (2013.01); *Y10T 477/6403* (2015.01)

(58) Field of Classification Search
None
See application file for complete search history.

(56) References Cited

U.S. PATENT DOCUMENTS 3,013,446 A * 12/1961 Charpentier ...................... 74/64
7,207,244 B2   4/2007 Chen
(Continued)

FOREIGN PATENT DOCUMENTS

CN        1623736 A    6/2005
DE    43 42 735 A1    6/1995
(Continued)

OTHER PUBLICATIONS

International Search Report dated Oct. 9, 2012 corresponding to International Patent Application No. PCT/JP2012/073519 and English translation thereof.
(Continued)

*Primary Examiner* — Ramya Burgess
*Assistant Examiner* — Mark Manley
(74) *Attorney, Agent, or Firm* — Squire Patton Boggs (US) LLP (57) ABSTRACT

In a drive control device in a drive system including a four joint link mechanism type continuously variable transmission having a one-way clutch (OWC) which can transmit only power from a power source to driving wheels, the drive control device is configured to limit a transmission ratio or an output of the power source when an output speed of the continuously variable transmission is lower than a threshold value. The threshold value is represented as an output speed of the continuously variable transmission at an intersection point of a line that represents an output torque where a maximum driving force is achieved and a line that represents a torque outputted when a swing angle of an input member of the OWC which converts rotational power from the power source into swing power becomes a maximum torsion angle.

16 Claims, 10 Drawing Sheets (51) Int. Cl.
*F16H 29/14* (2006.01)
*B60W 10/101* (2012.01)
*B60W 10/02* (2006.01)
*B60W 10/06* (2006.01)
*B60W 30/184* (2012.01)
*F16H 61/662* (2006.01)

(56) References Cited

U.S. PATENT DOCUMENTS

2005/0039572 A1 2/2005 Friedmann
2005/0192135 A1* 9/2005 Kawakita .................. 474/29
2005/0257651 A1 11/2005 Chen

FOREIGN PATENT DOCUMENTS

| | | |
|---|---|---|
| JP | 2000-346169 A | 12/2000 |
| JP | 2005-502543 A | 1/2005 |
| JP | 2011-190849 A | 9/2011 |
| WO | WO 2011/158604 A1 | 12/2011 |

OTHER PUBLICATIONS

Chinese Office Action for corresponding CN Appln. No. 201280042938.9, Aug. 31, 2015.

* cited by examiner

*FIG. 9C* IDLE STATE

*FIG. 9B* INTERMEDIATE STATE

*FIG. 9A* TORQUE TRANSMISSION STATE

FIG. 10

DRIVE CONTROL DEVICE

TECHNICAL FIELD

The present invention relates to a drive control device of a drive system including a power source and a continuously variable transmission.

BACKGROUND ART

A continuously variable transmission called an "IVT (Infinity Variable Transmission)" is known which converts a rotational movement of an output shaft of an engine into a swing movement and further converts the swing movement into a rotational movement to output the resulting movement from an output shaft of the transmission. In a transmission of this type, a transmission ratio can be varied in a stepless manner without the use of a clutch, and a maximum value of the transmission ratio can be set to infinity. Note that in such a transmission, an output speed obtained when the transmission ratio is set to infinity is zero.

Figure 4:
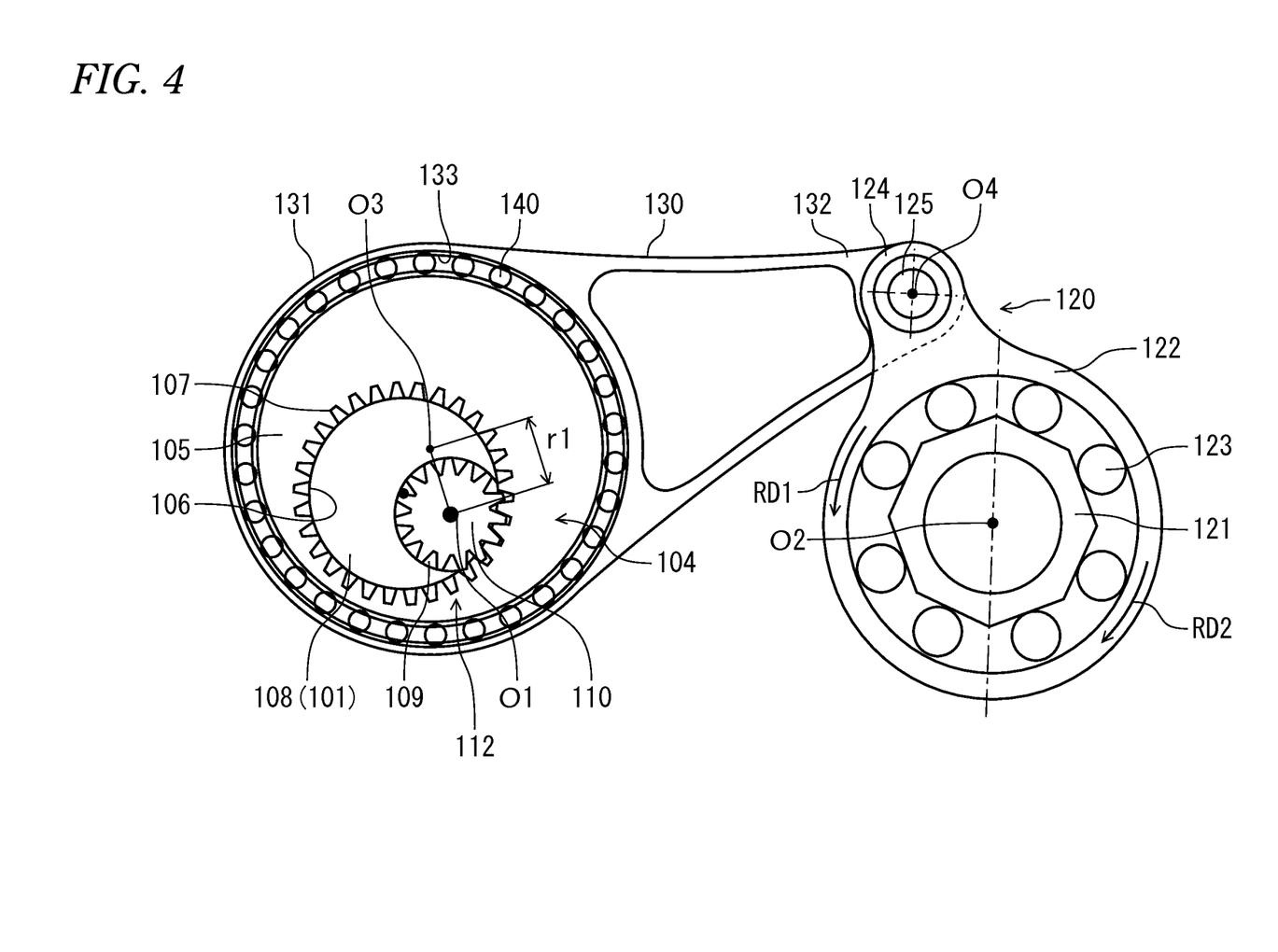
FIG. 4 is a side cross-sectional view illustrating a structure of part of a continuously variable transmission which is called an "IVT", as viewed in an axial direction thereof.

FIG. 4 is a side cross-sectional view illustrating a structure of part of a continuously variable transmission which is called an "IVT", as viewed in an axial direction thereof. The continuously variable transmission illustrated in FIG. 4 includes: an input shaft 101 that rotates around an input center axis O1 by receiving rotational power from a power source such as an internal combustion engine; an eccentric disk 104 that rotates together with the input shaft 101; a connection member 130 through which an input side and an output side are connected to each other; and a one-way clutch 120 provided at the output side.

The eccentric disk 104 is formed into a circular shape, with a first supporting point O3 located at its center. The first supporting point O3 is set so that the eccentric disk 104 rotates together with the input shaft 101 around the input center axis O1 while an eccentricity r1 variable with respect to the input center axis O1 is maintained. Accordingly, the eccentric disk 104 is set so that the eccentric disk 104 rotates eccentrically in accordance with a rotation of the input shaft 101 around the input center axis O1 while the eccentricity r1 is maintained.

As illustrated in FIG. 4, the eccentric disk 104 includes: an outer disk 105; and an inner disk 108 that is integral with the input shaft 101. The inner disk 108 is formed into a thick disk whose center is deviated by a given eccentricity distance with respect to the input center axis O1 serving as a center axis of the input shaft 101. The outer disk 105 is formed into a thick disk whose center is the first supporting point O3, and includes a first circular hole 106 whose center is deviated from the center of the outer disk 105 (i.e., the first supporting point O3). An outer periphery of the inner disk 108 is rotatably fitted to an inner periphery of the first circular hole 106.

The inner disk 108 is provided with a second circular hole 109 whose center is the input center axis O1 and whose peripheral portion is partially opened toward the outer periphery of the inner disk 108. A pinion 110 is rotatably contained inside the second circular hole 109. Through openings at an outer periphery of the second circular hole 109, teeth of the pinion 110 intermesh with an internal gear 107 provided at the inner periphery of the first circular hole 106 of the outer disk 105.

The pinion 110 is provided so as to be rotated coaxially with the input center axis O1 serving as the center axis of the input shaft 101. In other words, a rotation center of the pinion 110 coincides with the input center axis O1 serving as the center axis of the input shaft 101. The pinion 110 is rotated inside the second circular hole 109 by an actuator. In normal times, using, as a reference, a speed at which a rotation of the pinion 110 is synchronized with that of the input shaft 101, a speed which is above or below a speed of the input shaft 101 is given to the pinion 110, thus causing a relative rotation of the pinion 110 with respect to the input shaft 101. For example, when the pinion 110 and an output shaft of an actuator 180 are arranged so as to be connected to each other and a rotation difference occurs between a rotation of the actuator 180 and that of the input shaft 101, a speed reducing mechanism (e.g., a planetary gear) is used to change a relative angle between the input shaft 101 and the pinion 110 by a value obtained by multiplying the rotation difference by a speed reducing ratio, thus enabling the relative rotation of the pinion 110 with respect to the input shaft 101. In this case, the eccentricity r1 does not change when there is no rotation difference between the actuator 180 and the input shaft 101 and the rotations thereof are synchronized.

Accordingly, the rotation of the pinion 110 causes the internal gear 107 with which the teeth of the pinion 110 intermesh, i.e., the outer disk 105, to rotate relatively with respect to the inner disk 108, thus changing a distance (i.e., the eccentricity r1 of the eccentric disk 104) between the center of the pinion 110 (i.e., the input center axis O1) and the center of the outer disk 105 (i.e., the first supporting point O3).

In this case, settings are made so that the rotation of the pinion 110 can allow the center of the outer disk 105 (i.e., the first supporting point O3) to coincide with the center of the pinion 110 (i.e., the input center axis O1), and the eccentricity r1 of the eccentric disk 104 can be set to "zero" by allowing the center of the outer disk 105 and the center of the pinion 110 to coincide with each other.

The one-way clutch 120 includes: an output member (clutch inner) 121 that rotates around an output center axis O2 located away from the input center axis O1; a ring-like input member (clutch outer) 122 that swings around the output center axis O2 by receiving power in a rotational direction from outside; and a plurality of rollers (engagement members) 123 inserted between the input member 122 and the output member 121 so as to put the input member 122 and the output member 121 into a locked state or an unlocked state. Note that the one-way clutch 120 is provided with the rollers 123, the number of which corresponds to the number of sides of the output member 121 in a cross section thereof.

Power (torque) is transmitted from the input member 122 of the one-way clutch 120 to the output member 121 thereof on the condition that a rotational speed of the input member 122 in a forward direction (i.e., a direction indicated by an arrow RD1 in FIG. 4) exceeds a rotational speed of the output member 121 in the forward direction. Specifically, in the one-way clutch 120, it is not until the rotational speed of the input member 122 exceeds the rotational speed of the output member 121 that the input member 122 and the output member 121 are engaged (locked) with each other via the rollers 123, and swing power of the input member 122 is converted into a rotational movement of the output member 121.

A projected portion 124 is provided at one peripheral position of the input member 122, and the projected portion 124 is provided with a second supporting point O4 located away from the output center axis O2. A pin 125 is disposed on the second supporting point O4 of the input member 122, and a tip (other end) 132 of the connection member 130 is rotatably connected to the input member 122 via the pin 125.

The connection member 130 includes a ring portion 131 at its one end. An inner periphery of a circular opening 133 of the ring portion 131 is rotatably fitted to an outer periphery of the eccentric disk 104 via a bearing 140. Accordingly, the one end of the connection member 130 is rotatably connected to the outer periphery of the eccentric disk 104 while the other end of the connection member 130 is rotatably connected to the second supporting point O4 provided on the input member 122 of the one-way clutch 120 in the above-described manner, thus providing a four joint link mechanism in which four joints, i.e., the input center axis O1, the first supporting point O3, the output center axis O2 and the second supporting point O4, function as points of rotation as illustrated in FIG. 5.

Figure 5:
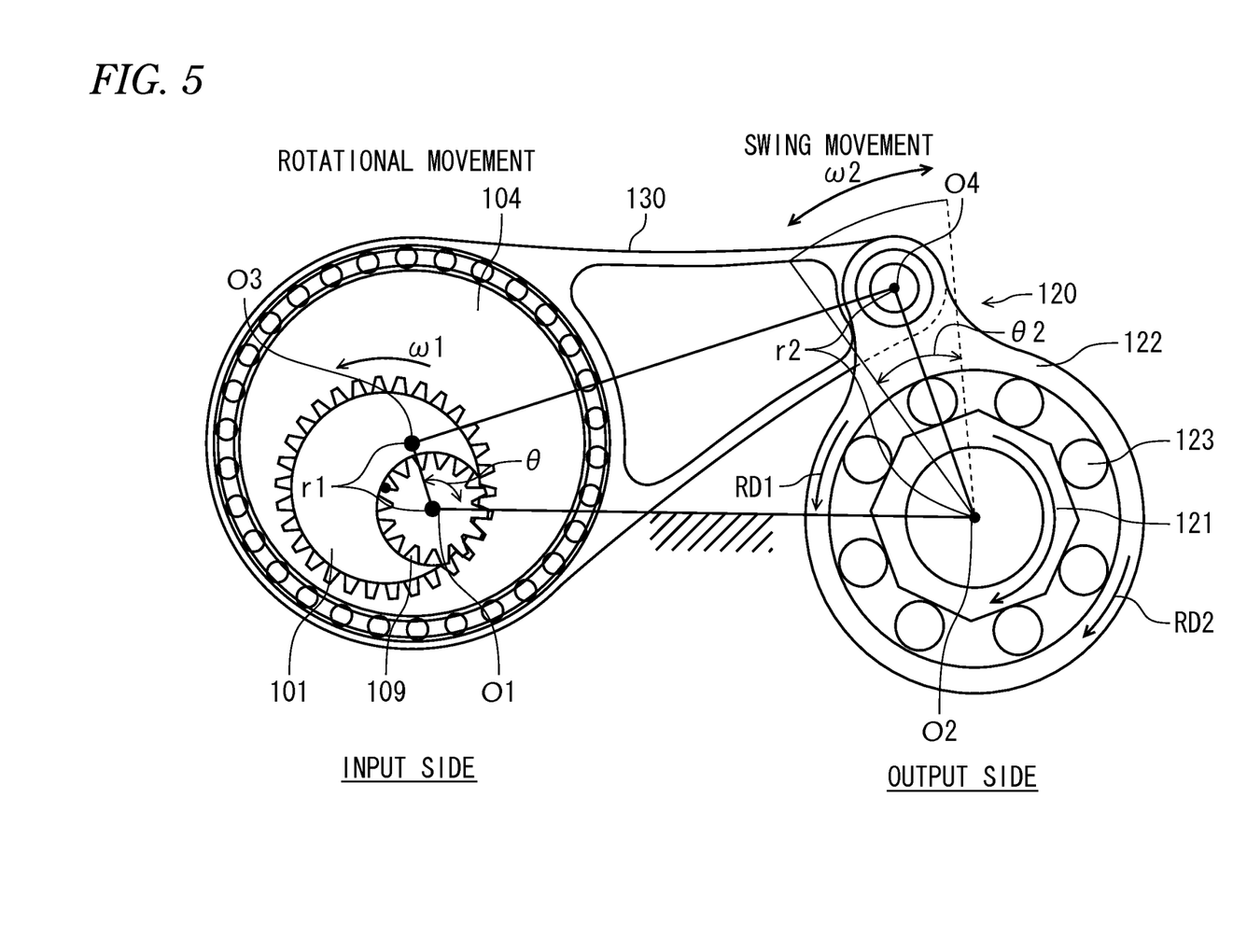
FIG. 5 is an explanatory diagram illustrating principles of driving force transmission in the continuously variable transmission provided as a four joint link mechanism.

FIG. 5 is an explanatory diagram illustrating principles of driving force transmission in a continuously variable transmission provided as the four joint link mechanism. In the four-joint link mechanism, a rotational movement given to the eccentric disk 104 from the input shaft 101 is transmitted, as a swing movement of the input member 122, to the input member 122 of the one-way clutch 120 via the connection member 130, and the swing movement of the input member 122 is converted into a rotational movement of the output member 121. A single rotation of the input shaft 101 which rotates the eccentric disk 104 causes a single reciprocating swing of the input member 122 of the one-way clutch 120. As illustrated in FIG. 5, irrespective of the value of the eccentricity r1 of the eccentric disk 104, a swing cycle of the input member 122 of the one-way clutch 120 always remains constant. An angular velocity $\omega_2$ of the input member 122 is determined by a rotational angular velocity $\omega_1$ of the eccentric disk 104 (input shaft 101) and the eccentricity r1 thereof.

In this case, in a transmission ratio variable mechanism 112 including: the pinion 110; the inner disk 108 that includes the second circular hole 109 in which the pinion 110 is contained; the outer disk 105 that includes the first circular hole 106 in which the inner disk 108 is rotatably contained; and the actuator 180, the eccentricity r1 of the eccentric disk 104 can be changed by moving the pinion 110 by the actuator 180. By changing the eccentricity r1, a swing angle $\theta_2$ of the input member 122 of the one-way clutch 120 can be changed, thus making it possible to change a ratio of a speed of the output member 121 to that of the input shaft 101 (i.e., a transmission ratio i). In other words, an adjustment to the eccentricity r1 of the first supporting point O3 with respect to the input center axis O1 changes the swing angle $\theta_2$ of a swing movement transmitted to the input member 122 of the one-way clutch 120 from the eccentric disk 104, thus making it possible to change the transmission ratio obtained when rotational power inputted to the input shaft 101 is transmitted to the output member 121 of the one-way clutch 120 via the eccentric disk 104 and the connection member 130.

FIGS. 6A to 6D and FIGS. 7A to 7C are explanatory diagrams illustrating principles of speed change effected by the transmission ratio variable mechanism 112 in the continuously variable transmission illustrated in FIG. 4. As illustrated in FIGS. 6 and 7, the pinion 110 of the transmission ratio variable mechanism 112 is rotated to rotate the outer disk 105 with respect to the inner disk 108, thus making it possible to adjust the eccentricity r1 of the eccentric disk 104 with respect to the input center axis O1 (i.e., the rotation center of the pinion 110).

Figures 6A, 6B:
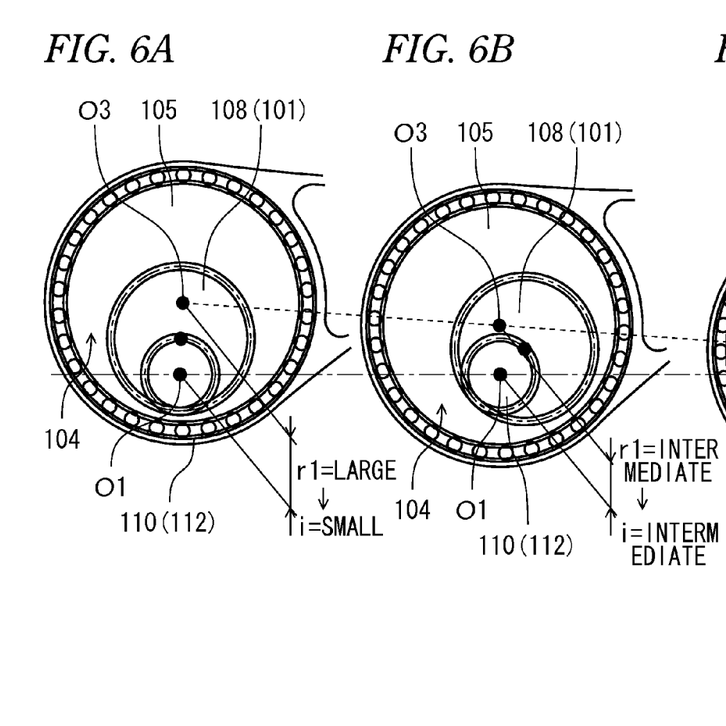
FIGS. 6A to 6D are explanatory diagrams illustrating principles of speed change using a transmission ratio variable mechanism 112 in the continuously variable transmission illustrated in FIG. 4.
Figure 6C:
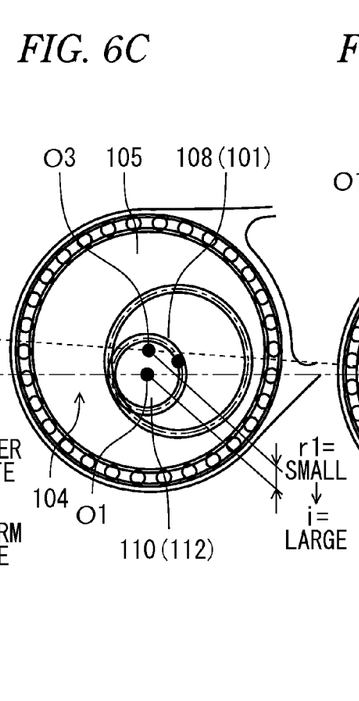
Figure 6D:
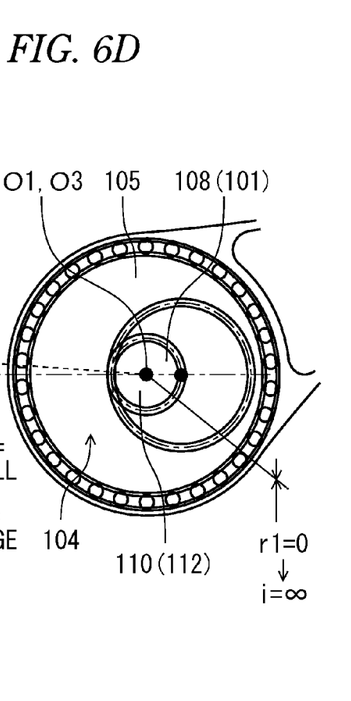
Figure 7A:
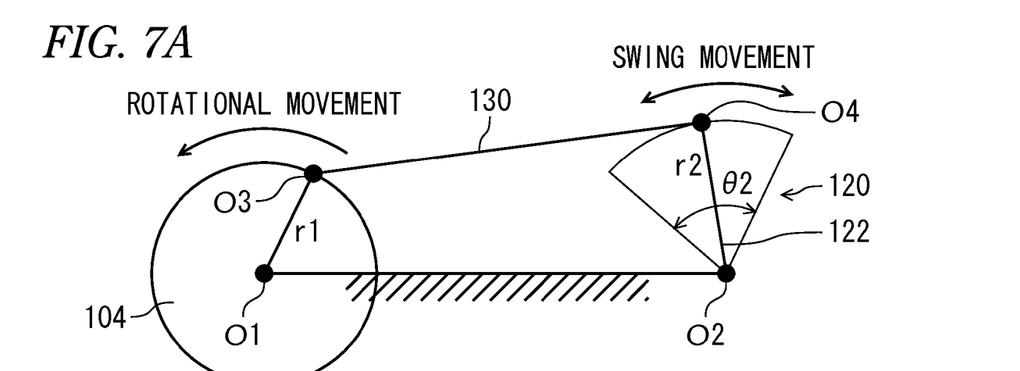
FIGS. 7A to 7C are explanatory diagrams illustrating principles of speed change using the transmission ratio variable mechanism 112 in the continuously variable transmission illustrated in FIG. 4.
Figure 7B:
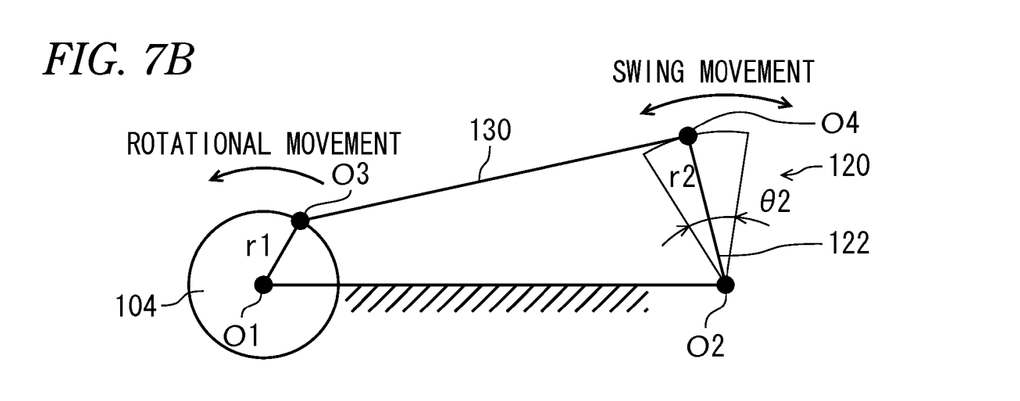
Figure 7C:
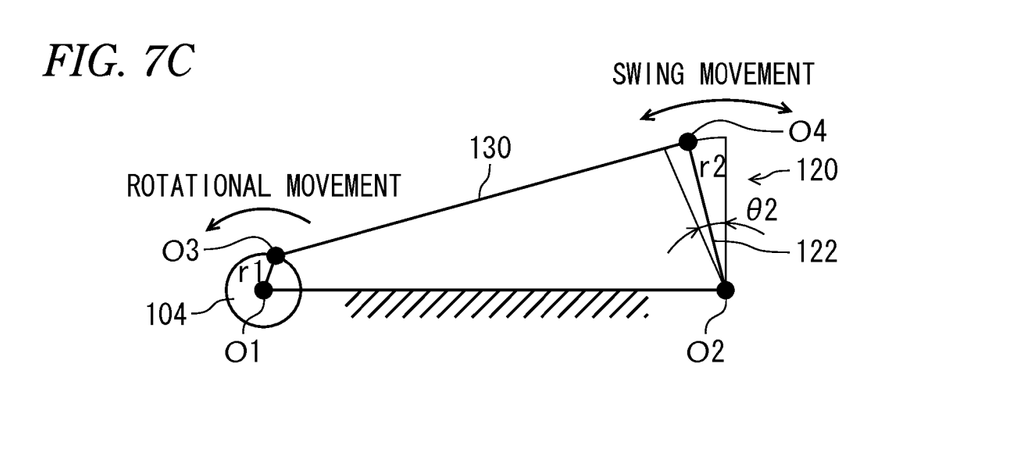

For example, as illustrated in FIG. 6A and FIG. 7A, when the eccentricity r1 of the eccentric disk 104 is set to "LARGE", the swing angle $\theta_2$ of the input member 122 of the one-way clutch 120 can be increased, and therefore, the low transmission ratio i can be achieved. As illustrated in FIG. 6B and FIG. 7B, when the eccentricity r1 of the eccentric disk 104 is set to "INTERMEDIATE", the swing angle $\theta_2$ of the input member 122 of the one-way clutch 120 can be set to "INTERMEDIATE", and therefore, the intermediate transmission ratio i can be achieved. As illustrated in FIG. 6C and FIG. 7C, when the eccentricity r1 of the eccentric disk 104 is set to "SMALL", the swing angle $\theta_2$ of the input member 122 of the one-way clutch 120 can be reduced, and therefore the high transmission ratio i can be achieved. As illustrated in FIG. 6D, when the eccentricity r1 of the eccentric disk 104 is set to "ZERO" or set below a minimum value, the swing angle $\theta_2$ of the input member 122 of the one-way clutch 120 can be set to "ZERO" or "MINIMUM", and therefore, the transmission ratio i can be set to "INFINITY ($\infty$)". Note that the minimum eccentricity r1 is the smallest eccentricity when rotational power inputted to the input shaft 101 is transmitted to the output member 121 of the one-way clutch 120 in the continuously variable transmission.

When the eccentricity r1 is zero in the transmission ratio variable mechanism 112 of the continuously variable transmission, the swing angle $\theta_2$ of the input member 122 of the one-way clutch 120 is zero. When the eccentricity r1 is greater than zero and smaller than the minimum value, the input member 122 swings at the very small swing angle $\theta_2$. However, the swing movement in this case is absorbed by a torsion characteristic of the rotors 123 which will be described later, and is therefore not transmitted to the output member 121. Accordingly, not only when the eccentricity r1 is zero but also when the eccentricity r1 is smaller than the minimum value, the transmission ratio i is eventually set to "INFINITY ($\infty$)".

Figure 8:
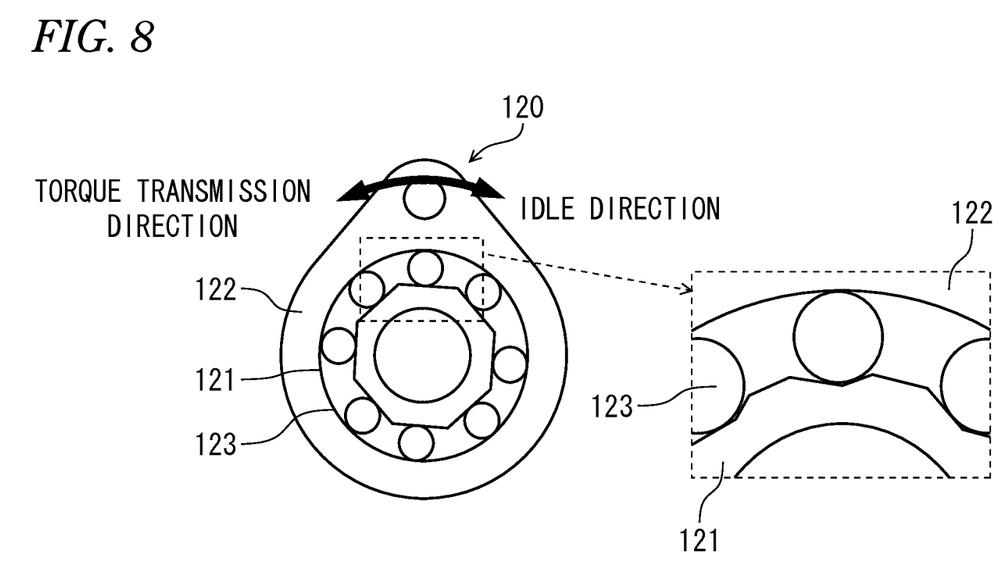
FIG. 8 is a cross-sectional view of the one-way clutch 120, a portion of which is enlarged.
Figure 9A:
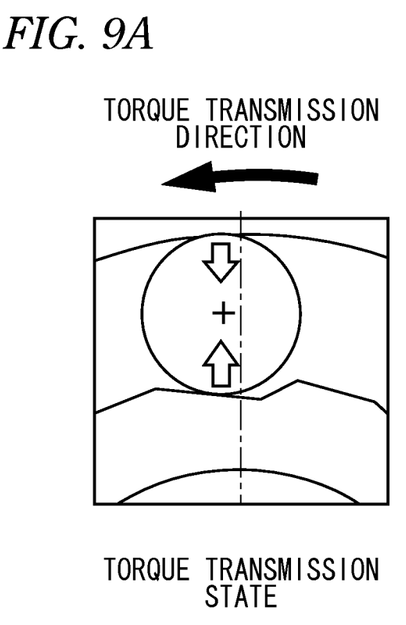
FIGS. 9A to 9C are partially enlarged views of the one-way clutch 120 in respective states.
Figure 9B:
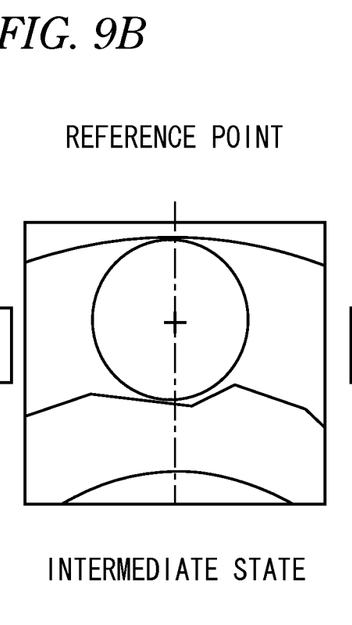
Figure 9C:
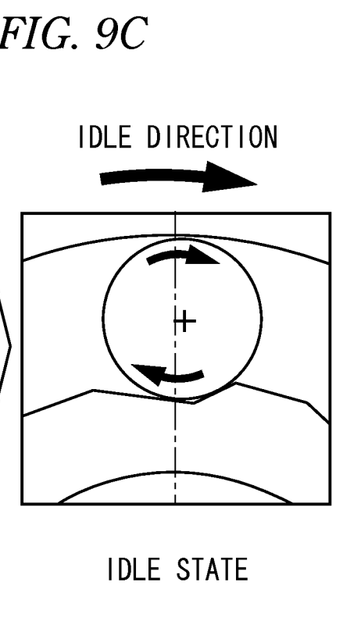

FIG. 8 is a cross-sectional view of the one-way clutch 120, a portion of which is enlarged. FIGS. 9A to 9C are partially enlarged views of the one-way clutch 120 in respective states. As illustrated in FIG. 8 and FIGS. 9A to 9C, a surface of the output member 121 which comes into contact with the rollers 123 includes dents along which the rollers 123 are movable in a swing direction in accordance with the swing movement of the input member 122. Note that depths of the dents vary depending on whether the input member 122 is moved in an idle direction or in a torque transmission direction illustrated in FIG. 8, and the depth of the dent at the position in the idle direction is deeper than that of the dent at the position in the torque transmission direction.

When the input member 122 swings in the idle direction relatively with respect to the output member 121, the rollers 123 also move in the idle direction. Space extending from the input member 122 to the output member 121 at the position in the idle direction is slightly larger than a size of each roller 123. Hence, the roller 123 that has moved to this position runs idle. On the other hand, when the input member 122 swings in the torque transmission direction relatively with respect to the output member 121, the rollers 123 also move in the torque transmission direction. Space extending from the input member 122 to the output member 121 at the position in the torque transmission direction is slightly smaller than the size of each roller 123. Hence, the roller 123 that has moved to this position is sandwiched between the input member 122 and the output member 121 and thus receives pressure in opposite directions from these members as illustrated in FIG. 9A. In this case, the input member 122 and the output member 121 are engaged (locked) with each other via the rollers 123, and swing power of the input member 122 is converted into a rotational movement of the output member 121. Thereafter, when the rotational speed of the input member 122 falls below that of the output member 121 and the input member 122 swings in the idle direction relatively with respect to the output member 121, the input member 122 and the output member 121, which have been locked via the rollers 123, are unlocked, and the one-way clutch 120 is brought back to a free state (idle state) as illustrated in FIG. 9C.

PRIOR ART REFERENCE

Patent Document

Patent Document 1: JP-A-2005-502543

SUMMARY OF THE INVENTION

Problems to be Solved by the Invention

The rollers 123 included in the one-way clutch 120 described above are made of a material such as metal that generally has high rigidity, but have the torsion (torsional) characteristic. The torsion characteristic is provided by a combination of different characteristics, one of which is based on sliding of the rollers 123 with respect to the input member 122 and the output member 121, and the other of which is based on elastic deformation of the rollers 123 caused by pressure applied from the input member 122 and the output member 121.

The characteristic of elastic deformation is referred to as a "maximum torsion angle", and is represented by a relative torsional angle between the output member 121 and the input member 122. The term "maximum torsion angle" refers to a relative angle of the input member 122 with respect to the output member 121 in the one-way clutch 120 when a continuously variable transmission 155 is in an engaged state, and more specifically refers to a relative angle of the input member 122 with respect to the output member 121, assuming that a relative angle therebetween at the start of engagement is 0 and when relative torsion occurs between the output member 121 and the input member 122 and a contact pressure between the rollers 123 and the input member 122 and output member 121 is maximized to the extent that lifespan-related reliability is ensured.

Figure 10:
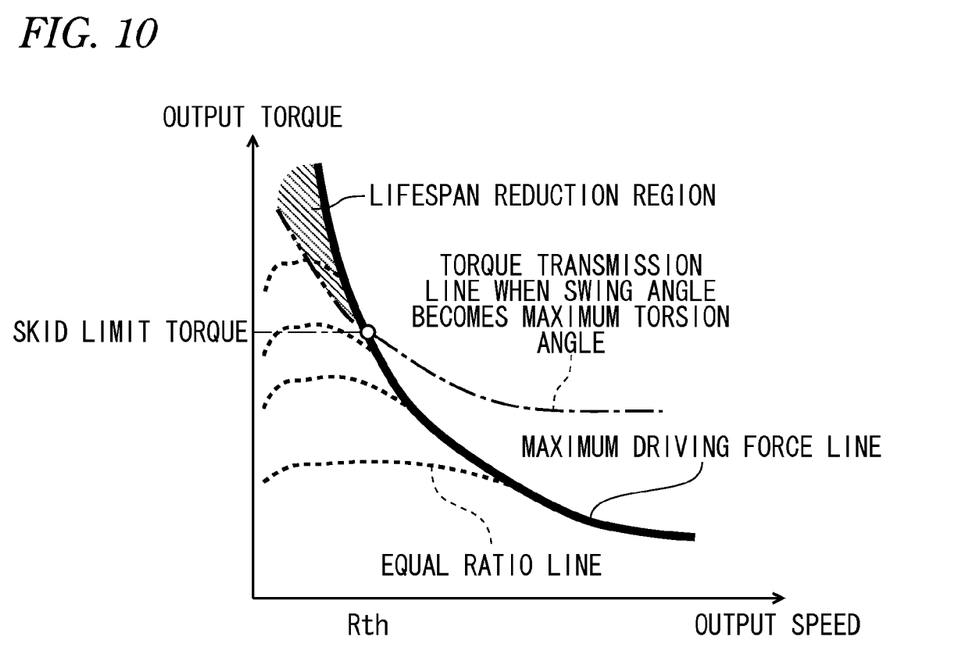
FIG. 10 is a graph illustrating a relationship between output torques (i.e., an output torque by which a maximum driving force is achieved, and a torque transmitted when the swing angle θ2 of the input member 122 in the one-way clutch 120 of the continuously variable transmission is the maximum torsion angle) with respect to an output speed of the continuously variable transmission.

FIG. 10 is a graph illustrating a relationship between output torques (i.e., an output torque by which a maximum driving force is achieved, and a torque transmitted when the swing angle θ2 of the input member 122 in the one-way clutch 120 of the continuously variable transmission is the maximum torsion angle) with respect to an output speed of the above-described continuously variable transmission. As illustrated in FIG. 10, a maximum driving force line is indicated by a thick solid line that represents the output torque by which the maximum driving force is achieved with respect to the output speed of the continuously variable transmission, a torque transmission line is indicated by a chain double-dashed line that represents the torque outputted with respect to the output speed of the continuously variable transmission when the swing angle θ2 is the maximum torsion angle, and the maximum driving force line and the torque transmission line intersect with each other. When an operating point of the output side of the continuously variable transmission is located within a region (lifespan reduction region) in which the output speed is lower than that at the intersection point of these two lines and which is surrounded by these lines and indicated by oblique lines, a force that exceeds an allowable value is applied to the rotors 123 of the one-way clutch 120. Accordingly, when the output side of the continuously variable transmission is operated in this region, the service life of the continuously variable transmission including the one-way clutch 120 is reduced.

In a standard vehicle in which the above-described continuously variable transmission is installed between a power source such as an internal combustion engine and a driving wheel, a torque limit value at which the driving wheel can grip a road surface (i.e., a skid limit torque) is set to be equal to or lower than the torque obtained at the intersection point of the two lines illustrated in FIG. 10. Accordingly, even when the output side of the continuously variable transmission is operated within the lifespan reduction region, the driving wheel is unable to transmit all the torque to the road surface and thus causes a skid. When the driving wheel skids, no torque that exceeds an allowable value is applied to the one-way clutch 120. However, for example, when a gripping force of the driving wheel is higher than normal or when a substance such as foreign matter having a high friction coefficient exists between the road surface and the driving wheel, the driving wheel does not skid and the torque is transmitted to the road surface even if the output side of the continuously variable transmission is operated within the lifespan reduction region. In this case, the torque that exceeds the allowable value is applied to the one-way clutch 120, and therefore, the service life of the continuously variable transmission is eventually reduced.

An object of the present invention is to provide a drive control device that can prevent a reduction in service life of a continuously variable transmission.

Solution to the Problems

To solve the above problems and achieve the above object, a first aspect of the present invention provides a drive control device (e.g., a management ECU 163 according to an embodiment of the present invention) of a drive system. The drive system includes: a power source (e.g., an internal combustion engine 151 according to the present embodiment) that generates a power for a vehicle to travel; and a four joint link mechanism type continuously variable transmission (e.g., a continuously variable transmission 155 according to the present embodiment) that transmits a power from the power source to a driving wheel (e.g., a driving wheel 169 according to the present embodiment) of the vehicle, the continuously variable transmission including a transmission mechanism that transmits a power from the power source to the driving wheel, and a one-way clutch (e.g., a one-way clutch 120 according to the present embodiment) disposed between the transmission mechanism and the driving wheel to transmit only a power from the power source to the driving wheel. When an output speed of the continuously variable transmission is lower than a threshold value, the drive control device is configured to limit at least one of a transmission ratio of the continuously variable transmission and an output of the power source. The threshold value is an output speed of the continuously variable transmission at an intersection point of a maximum driving line and a torque transmission line. The maximum driving line represents an output torque to obtain a maximum driving force for each output speed of the continuously variable transmission. The torque transmission line represents an output torque for each output speed of the continuously variable transmission when a swing angle of an input member of the one-way clutch is a maximum torsion angle. A rotational power from the power source is converted into the swing power and the converted swing power is inputted to the input member of the one-way clutch.

A second aspect of the present invention provides a drive control device (e.g., the management ECU 163 according to the present embodiment) of a drive system. The drive system comprises: a power source (e.g., the internal combustion engine 151 according to the present embodiment) that generates a power for a vehicle to travel; and a four joint link mechanism type continuously variable transmission (e.g., the continuously variable transmission 155 according to the present embodiment). The continuously variable transmission comprises: an input shaft (e.g., an input shaft 101 according to the present embodiment) that rotates around an input center axis (e.g., an input center axis O1 according to the present embodiment) by receiving a rotational power from the power source; an eccentric disk (e.g., an eccentric disk 104 according to the present embodiment) that includes, at its center, a first supporting point (e.g., a first supporting point O3 according to the present embodiment) whose eccentricity (e.g., an eccentricity r1 according to the present embodiment) with respect to the input center axis can be varied, the eccentric disk being rotated together with the input shaft around the input center axis while maintaining the eccentricity; a one-way clutch (e.g., a one-way clutch 120 according to the present embodiment) comprising: an output member (e.g., an output member 121 according to the present embodiment) that rotates around an output center axis (e.g., an output center axis O2 according to the present embodiment) located away from the input center axis, an input member (e.g., an input member 122 according to the present embodiment) that swings around the output center axis by receiving a rotational power from outside; and an engagement member (e.g., a roller 123 according to the present embodiment) that allows the input member and the output member to be in a locked state or an unlocked state, wherein the one-way clutch is configured to transmit a rotational power inputted to the input member to the output member so as to convert a swing movement of the input member into a rotational movement of the output member, when a forward rotational speed of the input member exceeds a forward rotational speed of the output member; a connection member (e.g., a connection member 130 according to the present embodiment) configured to transmit a rotational movement, which is provided to the eccentric disk from the input shaft, to the input member of the one-way clutch as a swing movement of the input member, wherein one end of the connection member is connected to an outer periphery of the eccentric disk so as to be rotatable around the first supporting point, and the other end of the connection member is rotatably connected to a second supporting point (e.g., a second supporting point O4 according to the present embodiment) which is located on the input member of the one-way clutch and away from the output center axis; an actuator (e.g., an actuator 180 according to the present embodiment) configured to adjust the eccentricity of the first supporting point with respect to the input center axis so as to change a swing angle of the swing movement transmitted to the input member of the one-way clutch from the eccentric disk. The continuously variable transmission has a transmission ratio variable mechanism (e.g., a transmission ratio variable mechanism 112 according to the present embodiment) in which a transmission ratio between the rotational power inputted to the input shaft and the rotation power transmitted to the output member of the one-way clutch via the eccentric disk and the connection member is changed, and the transmission ratio can be set to infinity by setting the eccentricity such that the rotational power is not transmitted to the output member. When an output speed of the continuously variable transmission is lower than a threshold value, the drive control device is configured to limit at least one of the transmission ratio of the continuously variable transmission and an output of the power source. The threshold value is an output speed of the continuously variable transmission at an intersection point of a maximum driving line and a torque transmission line, wherein the maximum driving line represents an output torque to obtain a maximum driving force for each output speed of the continuously variable transmission, and wherein the torque transmission line represents an output torque for each output speed of the continuously variable transmission when the swing angle of the input member of the one-way clutch is a maximum torsion angle.

A third aspect of the present invention provides the drive control device, wherein when an output speed at an operating point of an output side of the continuously variable transmission ratio is lower than an output speed at the intersection point of the maximum driving line and the torque transmission line, and the operation point is located within a region surrounded by the maximum driving line and the torque transmission line, the drive control device is configured to limit at least one of the transmission ratio of the continuously variable transmission and the output of the power source.

A fourth aspect of the present invention provides the drive control device, wherein when the drive control device limits the transmission ratio of the continuously variable transmission, the transmission ratio is limited to equal to or lower than a transmission ratio at the intersection point.

A fifth aspect of the present invention provides the drive control device, wherein when the power source is an internal combustion engine and the power control device limits the output of the power source, at least one of an amount of fuel injection, ignition timing, and an amount of fresh air is adjusted.

Effects of the Invention

In the drive control device according to the first to fifth aspects of the present invention, a reduction in service life of the continuously variable transmission can be prevented.

In the drive control device according to the fourth aspect of the present invention, a reduction in service life of the continuously variable transmission can be prevented; in addition, a required output torque can be obtained, and a speed of the power source can be set low, thus making it possible to enhance fuel efficiency.

In the drive control device according to the fifth aspect of the present invention, the output of the power source can be limited immediately.

MODE FOR CARRYING OUT THE INVENTION

Hereinafter, an embodiment of the present invention will be described with reference to the drawings.

Figure 1:
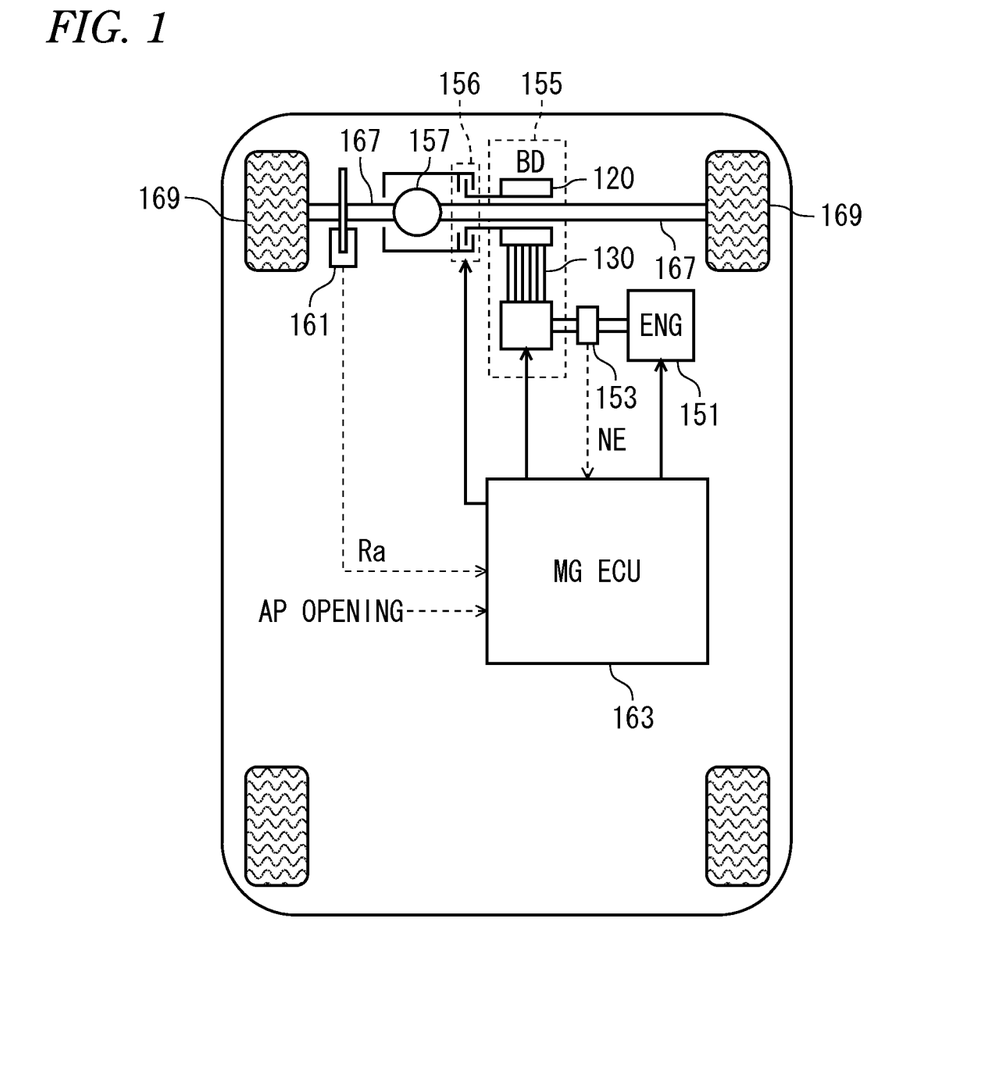
FIG. 1 is a block diagram illustrating an inner configuration of a vehicle.

FIG. 1 is a block diagram illustrating an inner configuration of a vehicle. The vehicle illustrated in FIG. 1 includes: an internal combustion engine (ENG) 151; a speed sensor 153; a continuously variable transmission 155 provided as a four joint link mechanism; a clutch 156; a differential gear 157; a shaft speed sensor 161; and a management ECU (MG ECU) 163. Note that dotted line arrows in FIG. 1 represent value data, and solid line arrows in FIG. 1 represent control signals including instruction descriptions.

The internal combustion engine 151 generates a power necessary for vehicle traveling. An output of the internal combustion engine 151 is inputted to the continuously variable transmission 155. The speed sensor 153 detects a speed NE of the internal combustion engine 151 (which is equivalent to an input speed of the continuously variable transmission 155). A signal indicative of the speed NE detected by the speed sensor 153 is inputted to the management ECU 163.

The continuously variable transmission 155 is the continuously variable transmission which is called an "IVT (Infinity Variable Transmission)" and has been described above with reference to FIGS. 4 to 9. Hereinafter, the continuously variable transmission 155 may also be represented by "BD". In the present embodiment, no clutch needs to be provided between the continuously variable transmission 155 and the internal combustion engine 151, and the output of the internal combustion engine 151 is directly inputted to an input shaft of the continuously variable transmission 155. An output of the continuously variable transmission 155 is transmitted to axle shafts 167 via the clutch 156 and the differential gear 157.

The continuously variable transmission 155 converts a rotational movement of an output shaft of the internal combustion engine 151 into a swing movement, and further converts the swing movement into a rotational movement. Therefore, the continuously variable transmission 155 can change a transmission ratio in a stepless manner by adjusting an eccentricity r1, and can set a maximum value of the transmission ratio to infinity. Note that an output speed obtained when the transmission ratio is set to infinity is zero in the continuously variable transmission 155. As illustrated in FIG. 4, the continuously variable transmission 155 includes: an eccentric body driving device whose input shaft is directly connected to a crankshaft of the internal combustion engine 151; a one-way clutch 120 provided at an output side; and a connection member 130 through which the eccentric body driving device and the one-way clutch 120 are connected to each other.

The eccentric body driving device includes: an input shaft 101 that rotates around an input center axis O1 by receiving rotational power from the internal combustion engine 151; and an eccentric disk 104 that rotates together with the input shaft 101. The eccentric body driving device is provided with a pinion 110 that rotates coaxially with the input center axis O1. Upon rotation of the pinion 110, a distance (i.e., the eccentricity r1 of the eccentric disk 104) between the center of the pinion 110 (i.e., the input center axis O1) and a first supporting point O3 is changed. When the first supporting point O3 is allowed to coincide with the input center axis O1 as a result of the rotation of the pinion 110, the eccentricity r1 of the eccentric disk 104 is "ZERO", and the transmission ratio of the continuously variable transmission 155 is set to infinity.

Power is transmitted from an input member 122 of the one-way clutch 120 to an output member 121 thereof on the condition that a rotational speed of the input member 122 in a forward direction (i.e., a direction indicated by an arrow RD1 in FIG. 4) exceeds a rotational speed of the output member 121 in the forward direction. Specifically, in the one-way clutch 120, it is not until the rotational speed of the input member 122 exceeds the rotational speed of the output member 121 that the input member 122 and the output member 121 are engaged (locked) with each other via rollers 123, and swing power of the input member 122 is converted into a rotational movement of the output member 121. Accordingly, in the vehicle illustrated in FIG. 1, power is transmitted from the internal combustion engine 151 to driving wheels 169 via the continuously variable transmission 155 on the condition that the rotational speed of the input member 122 of the one-way clutch 120 in the forward direction, which results from the output of the internal combustion engine 151, exceeds the rotational speed of the output member 121 in the forward direction. Note that a state of the continuously variable transmission 155 will be referred to as an "engaged state" when the above condition is satisfied, and a state of the continuously variable transmission 155 will be referred to as a "disengaged state" when the above condition is not satisfied.

The clutch 156 opens and closes a driving force transmission path from the continuously variable transmission 155 to the differential gear 157. The clutch 156 is controlled by the management ECU 163. The differential gear 157 distributes a driving force, which has been transmitted from the internal combustion engine 151, to the axle shafts 167 located at right and left sides of the vehicle.

The shaft speed sensor 161 detects a speed Ra of the axle shaft 167 (which will hereinafter be referred to as a "shaft speed"). A signal indicative of the shaft speed Ra detected by the shaft speed sensor 161 is sent to the management ECU 163. Note that in the present embodiment, the shaft speed Ra is equivalent to the output speed of the continuously variable transmission 155. In addition to the signal from the shaft speed sensor 161, a signal indicative of an opening of an accelerator pedal operated by a driver (i.e., an AP opening) is also inputted to the management ECU 163.

The management ECU 163 carries out overall control of the internal combustion engine 151 and the continuously variable transmission 155, for example. In particular, in the present embodiment, the management ECU 163 calculates a traveling speed (vehicle speed) VP of the vehicle from the shaft speed Ra, and derives an output requirement P on the basis of the vehicle speed VP and the AP opening. The management ECU 163 also sets a target output of the internal combustion engine 151 and a target transmission ratio of the continuously variable transmission 155 in accordance with the output requirement P.

Figure 2:
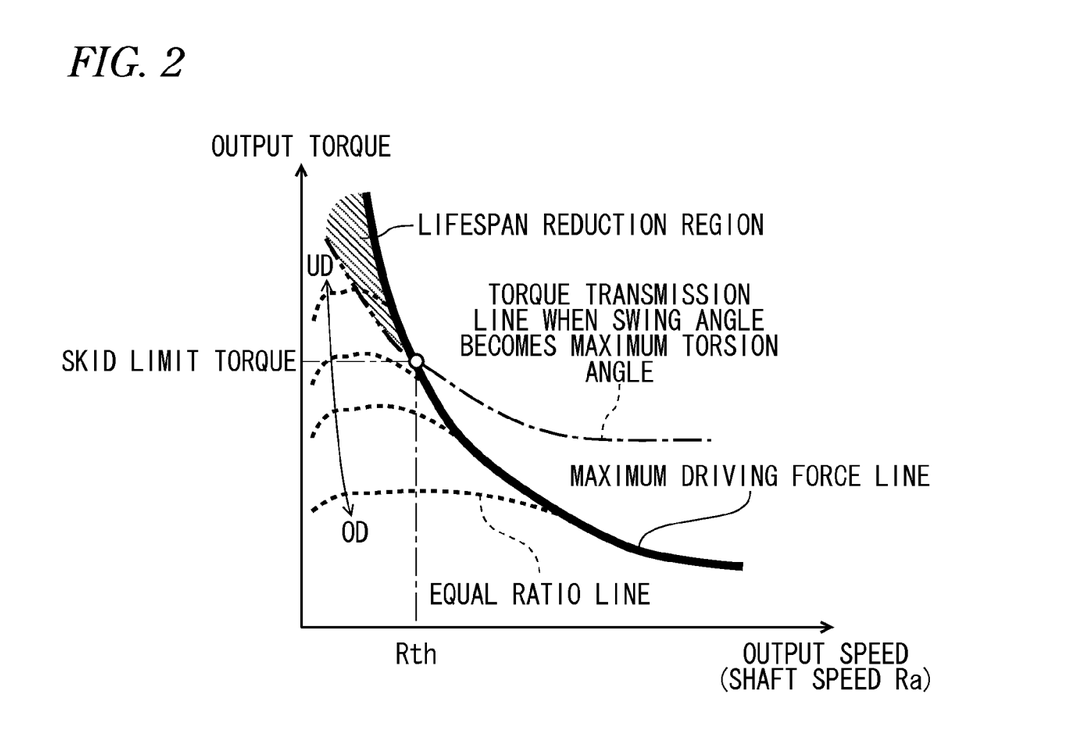
FIG. 2 is a graph illustrating a relationship between output torques (i.e., an output torque by which a maximum driving force is achieved, and a torque transmitted when a swing angle θ2 of an input member 122 in a one-way clutch 120 of a continuously variable transmission 155 is a maximum torsion angle) with respect to an output speed of the continuously variable transmission 155.

Assume that the shaft speed Ra is lower than a threshold value, and that an operating point of the output side of the continuously variable transmission 155, corresponding to the target output of the internal combustion engine 151 and the target transmission ratio of the continuously variable transmission 155 set in accordance with the output requirement P, is located within a lifespan reduction region illustrated in FIG. 10. Then, the management ECU 163 resets the target output of the internal combustion engine 151 and the target transmission ratio of the continuously variable transmission 155. In this case, the management ECU 163 resets the target output of the internal combustion engine 151 and the target transmission ratio of the continuously variable transmission 155 by imposing limitations thereon so that the operating point of the output side of the continuously variable transmission 155 is located outside the lifespan reduction region while the output requirement P is satisfied as far as possible. Note that the threshold value of the shaft speed Ra is an output speed Rth of the continuously variable transmission 155 at an intersection point of a maximum driving force line and a torque transmission line, which is obtained when a swing angle of the input member 122 is a maximum torsion angle, as illustrated in FIG. 2.

The management ECU 163 may reset the target output of the internal combustion engine 151 and the target transmission ratio of the continuously variable transmission 155 by imposing a limitation on either one of the target output and the target transmission ratio. For example, the following methods 1 to 3 are conceivable.

Method 1: An output torque of the internal combustion engine 151 is reduced without changing the target transmission ratio.

Method 2: The target transmission ratio is changed to an OD (overdrive) side, and a speed of the internal combustion engine 151 is reduced. In this case, the output torque of the internal combustion engine 151 is also adjusted in accordance with this change.

Method 3: The target transmission ratio is changed to a UD (underdrive) side, the speed of the internal combustion engine 151 is increased, and the output torque of the internal combustion engine 151 is reduced.

Note that in view of fuel efficiency, the internal combustion engine 151 is preferably operated so that its speed is reduced and its torque is increased. In this respect, Method 1 or Method 2 is preferable.

The management ECU 163 controls the internal combustion engine 151 so that the output of the internal combustion engine 151 reaches the target output, and also controls the eccentricity r1 of the eccentric disk 104 of the continuously variable transmission 155 so that the transmission ratio of the continuously variable transmission 155 reaches the target transmission ratio. In controlling the internal combustion engine 151 so that the output of the internal combustion engine 151 reaches the target output, the management ECU 163 adjusts the output by adjusting at least one of an amount of fuel injection, ignition timing and an amount of fresh air in the internal combustion engine 151. Note that the term "amount of fresh air" refers to an amount of oxygen supplied to the internal combustion engine 151 in accordance with a throttle opening, for example.

Figure 3:
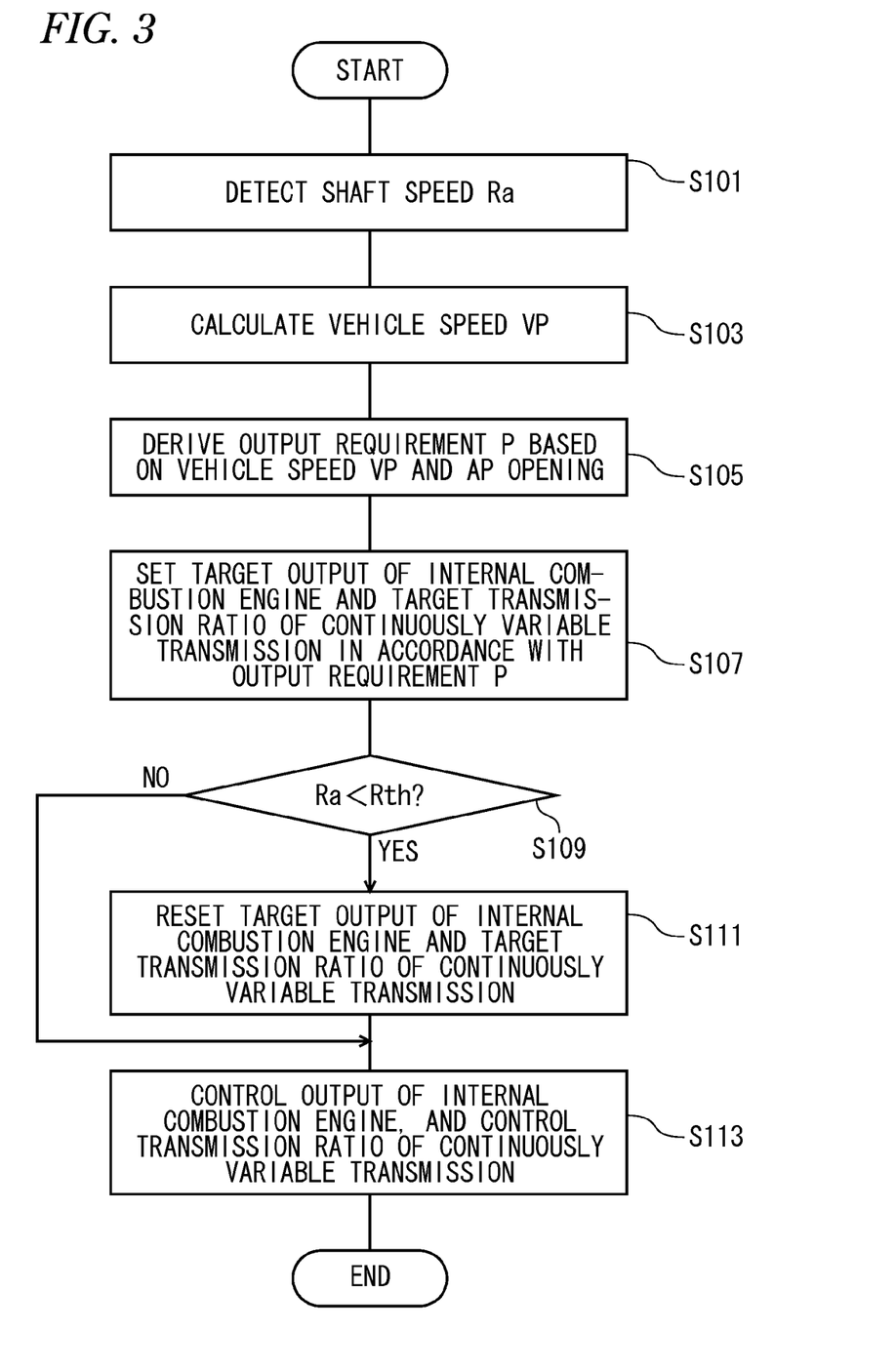
FIG. 3 is a flow chart illustrating operations performed when an internal combustion engine 151 and the continuously variable transmission 155 are controlled by a management ECU 163.

FIG. 3 is a flow chart illustrating operations performed when the internal combustion engine 151 and the continuously variable transmission 155 are controlled by the management ECU 163. As illustrated in FIG. 3, the management ECU 163 detects the shaft speed Ra on the basis of the signal from the shaft speed sensor 161 (Step S101). Then, the management ECU 163 calculates the vehicle speed VP from the shaft speed Ra (Step S103). Subsequently, the management ECU 163 derives the output requirement P on the basis of the vehicle speed VP and the AP opening (Step S105). Next, the management ECU 163 sets the target output of the internal combustion engine 151 and the target transmission ratio of the continuously variable transmission 155 in accordance with the output requirement P (Step S107).

Then, the management ECU 163 determines whether or not the shaft speed Ra is lower than the threshold value Rth (which is the output speed of the continuously variable transmission 155 at the intersection point of the maximum driving force line and the torque transmission line illustrated in FIG. 2), i.e., Ra<Rth (Step S109). Upon determination in Step S109 that Ra<Rth, the process goes to Step S111. When Ra≥Rth, the process goes to Step S113.

In Step S111, the management ECU 163 resets the target output of the internal combustion engine 151 and the target transmission ratio of the continuously variable transmission 155 by imposing limitations thereon. In Step S113, the management ECU 163 controls the internal combustion engine 151 so that the output of the internal combustion engine 151 reaches the target output, and also controls the continuously variable transmission 155 so that the transmission ratio of the continuously variable transmission 155 reaches the target transmission ratio.

As described above, in the present embodiment, when the operating point of the output side of the continuously variable transmission 155 which is set in accordance with the output requirement P is located within the lifespan reduction region illustrated in FIG. 2, the target output of the internal combustion engine 151 and the target transmission ratio of the continuously variable transmission 155 are reset by imposing limitations thereon so that the operating point of the output side of the continuously variable transmission 155 is located outside the lifespan reduction region. Accordingly, the output side of the continuously variable transmission 155 is not driven at the operating point within the lifespan reduction region, and therefore, no torque that exceeds the allowable value is applied to the one-way clutch 120. As a result, a reduction in service life of the continuously variable transmission 155 can be prevented.

When the output torque of the internal combustion engine 151 is reduced without changing the target transmission ratio of the continuously variable transmission 155 which is to be reset, or when the target transmission ratio is changed to the OD (overdrive) side and the speed of the internal combustion engine 151 is reduced, a reduction in service life of the continuously variable transmission 155 can be prevented; in addition, the required torque is obtained, and the speed of the internal combustion engine 151 can be set low, thus making it possible to enhance fuel efficiency. The target output of the internal combustion engine 151, which is to be reset, is reset by adjusting at least one of the amount of fuel injection, ignition timing, and the amount of fresh air in the internal combustion engine 151. As a result, the output of the internal combustion engine 151 can be limited immediately.

Although the present invention has been described in detail with reference to the specific embodiment thereof, it is evident to those skilled in the art that various changes and modifications may be made without departing from the spirit and scope of the present invention.

The present application is based on Japanese Patent Application No. 2011-201025 filed on Sep. 14, 2011, the contents of which are hereby incorporated by reference.

DESCRIPTION OF REFERENCE CHARACTERS 101 input shaft
104 eccentric disk
120 one-way clutch
121 output member
122 input member 123 roller (engagement member)
130 connection member
151 internal combustion engine (ENG)
153 speed sensor
155 continuously variable transmission (BD)
156 clutch
157 differential gear
161 shaft speed sensor
163 management ECU (MG ECU)
167 axle shaft
169 driving wheel

The invention claimed is:

1. A drive control device of a drive system,
wherein the drive system comprises:
a power source that generates a power for a vehicle to travel; and
a four-joint link mechanism type continuously variable transmission that transmits a power from the power source to a driving wheel of the vehicle, the continuously variable transmission comprising:
a transmission mechanism that transmits a power from the power source to the driving wheel; and
a one-way clutch disposed between the transmission mechanism and the driving wheel to transmit only a power from the power source to the driving wheel,
wherein when an output speed of the continuously variable transmission is lower than a threshold value, the drive control device is configured to limit at least one of a transmission ratio of the continuously variable transmission and an output of the power source,
wherein the threshold value is an output speed of the continuously variable transmission at an intersection point of a maximum driving line and a torque transmission line, wherein the maximum driving line represents an output torque to obtain a maximum driving force for each output speed of the continuously variable transmission, and wherein the torque transmission line represents an output torque for each output speed of the continuously variable transmission when a swing angle of an input member of the one-way clutch is a maximum torsion angle, wherein a rotational power from the power source is converted into swing power and the converted swing power is inputted to the input member of the one-way clutch.

2. A drive control device of a drive system,
wherein the drive system comprises:
a power source that generates a power for a vehicle to travel; and
a four-joint link mechanism type continuously variable transmission comprising:
an input shaft that rotates around an input center axis by receiving a rotational power from the power source;
an eccentric disk that includes, at its center, a first supporting point whose eccentricity with respect to the input center axis can be varied, the eccentric disk being rotated together with the input shaft around the input center axis while maintaining the eccentricity;
a one-way clutch comprising:
an output member that rotates around an output center axis located away from the input center axis;
an input member that swings around the output center axis by receiving a rotational power from outside; and
an engagement member that allows the input member and the output member to be in a locked state or an unlocked state,
wherein the one-way clutch is configured to transmit a rotational power inputted to the input member to the output member so as to convert a swing movement of the input member into a rotational movement of the output member, when a forward rotational speed of the input member exceeds a forward rotational speed of the output member;
a connection member configured to transmit a rotational movement, which is provided to the eccentric disk from the input shaft, to the input member of the one-way clutch as a swing movement of the input member, wherein one end of the connection member is connected to an outer periphery of the eccentric disk so as to be rotatable around the first supporting point, and the other end of the connection member is rotatably connected to a second supporting point which is located on the input member of the one-way clutch and away from the output center axis;
an actuator configured to adjust the eccentricity of the first supporting point with respect to the input center axis so as to change a swing angle of the swing movement transmitted to the input member of the one-way clutch from the eccentric disk,
wherein the continuously variable transmission has a transmission ratio variable mechanism in which a transmission ratio between the rotational power inputted to the input shaft and the rotation power transmitted to the output member of the one-way clutch via the eccentric disk and the connection member is changed, and the transmission ratio can be set to infinity by setting the eccentricity such that the rotational power is not transmitted to the output member,
wherein when an output speed of the continuously variable transmission is lower than a threshold value, the drive control device is configured to limit at least one of the transmission ratio of the continuously variable transmission and an output of the power source, and
wherein the threshold value is an output speed of the continuously variable transmission at an intersection point of a maximum driving line and a torque transmission line, wherein the maximum driving line represents an output torque to obtain a maximum driving force for each output speed of the continuously variable transmission, and wherein the torque transmission line represents an output torque for each output speed of the continuously variable transmission when the swing angle of the input member of the one-way clutch is a maximum torsion angle.

3. The drive control device of claim 1, wherein when an output speed at an operating point of an output side of the continuously variable transmission ratio is lower than an output speed at the intersection point of the maximum driving line and the torque transmission line, and the operation point is located within a region surrounded by the maximum driving line and the torque transmission line, the drive control device is configured to limit at least one of the transmission ratio of the continuously variable transmission and the output of the power source.

4. The drive control device of claim 1, wherein when the drive control device limits the transmission ratio of the continuously variable transmission, the transmission ratio is limited to being equal to or lower than a transmission ratio at the intersection point.

5. The drive control device of claim 1, wherein when the power source is an internal combustion engine and the power control device limits the output of the power source, at least one of an amount of fuel injection, ignition timing, and an amount of fresh air is adjusted.

6. The drive control device of claim 2, wherein when an output speed at an operating point of an output side of the continuously variable transmission ratio is lower than an output speed at the intersection point of the maximum driving line and the torque transmission line, and the operation point is located within a region surrounded by the maximum driving line and the torque transmission line, the drive control device is configured to limit at least one of the transmission ratio of the continuously variable transmission and the output of the power source.

7. The drive control device of claim 2, wherein when the drive control device limits the transmission ratio of the continuously variable transmission, the transmission ratio is limited to being equal to or lower than a transmission ratio at the intersection point.

8. The drive control device of claim 3, wherein when the drive control device limits the transmission ratio of the continuously variable transmission, the transmission ratio is limited to being equal to or lower than a transmission ratio at the intersection point.

9. The drive control device of claim 6, wherein when the drive control device limits the transmission ratio of the continuously variable transmission, the transmission ratio is limited to being to or lower than a transmission ratio at the intersection point.

10. The drive control device of claim 2, wherein when the power source is an internal combustion engine and the power control device limits the output of the power source, at least one of an amount of fuel injection, ignition timing, and an amount of fresh air is adjusted.

11. The drive control device of claim 3, wherein when the power source is an internal combustion engine and the power control device limits the output of the power source, at least one of an amount of fuel injection, ignition timing, and an amount of fresh air is adjusted.

12. The drive control device of claim 4, wherein when the power source is an internal combustion engine and the power control device limits the output of the power source, at least one of an amount of fuel injection, ignition timing, and an amount of fresh air is adjusted.

13. The drive control device of claim 6, wherein when the power source is an internal combustion engine and the power control device limits the output of the power source, at least one of an amount of fuel injection, ignition timing, and an amount of fresh air is adjusted.

14. The drive control device of claim 7, wherein when the power source is an internal combustion engine and the power control device limits the output of the power source, at least one of an amount of fuel injection, ignition timing, and an amount of fresh air is adjusted.

15. The drive control device of claim 8, wherein when the power source is an internal combustion engine and the power control device limits the output of the power source, at least one of an amount of fuel injection, ignition timing, and an amount of fresh air is adjusted.

16. The drive control device of claim 9, wherein when the power source is an internal combustion engine and the power control device limits the output of the power source, at least one of an amount of fuel injection, ignition timing, and an amount of fresh air is adjusted.

* * * * *